United States Patent [19]
Matsushita et al.

[11] Patent Number: 5,465,945
[45] Date of Patent: Nov. 14, 1995

[54] LAMINATED RUBBER SUPPORT AND METHOD OF DESIGNING THE SAME

[75] Inventors: Hiroomi Matsushita; Teruo Sasaki; Kazuhiro Fujisawa, all of Hyogo, Japan

[73] Assignee: Sumitomo Rubber Industries, Inc., Kobe, Japan

[21] Appl. No.: 30,001

[22] PCT Filed: Aug. 19, 1992

[86] PCT No.: PCT/JP92/01050

§ 371 Date: Mar. 19, 1993

§ 102(e) Date: Mar. 19, 1993

[87] PCT Pub. No.: WO93/04301

PCT Pub. Date: Mar. 4, 1993

[30] Foreign Application Priority Data

Aug. 23, 1991 [JP] Japan ................ 3-212124

[51] Int. Cl.$^6$ ............................................. F16F 1/40
[52] U.S. Cl. .................................. 267/294; 267/153
[58] Field of Search ........................ 267/30, 292, 294, 267/141.1, 152, 153; 248/634, 636, 562

[56] References Cited

U.S. PATENT DOCUMENTS

| | | | |
|---|---|---|---|
| 3,575,403 | 4/1971 | Hamel | 267/294 |
| 3,920,231 | 11/1975 | Harrison et al. | 267/294 |
| 4,978,581 | 12/1990 | Fukahori . | |

FOREIGN PATENT DOCUMENTS

| | | |
|---|---|---|
| 2602293 | 8/1987 | France . |
| 168930 | 9/1985 | Japan . |
| 3-37435 | 2/1991 | Japan . |

*Primary Examiner*—Robert J. Oberleitner
*Assistant Examiner*—Lee W. Young
*Attorney, Agent, or Firm*—Nikaido Marmelstein Murray & Oram

[57] ABSTRACT

The invention discloses a method for determining the inner diameter of the hollow portion of a laminate and is intended to design a laminated rubber support having an appropriate shape. This method includes, in a laminated rubber support having rigid plates and rubber-like elastic plates alternately laminated to each other to form a laminate having a vertically extending cylindrical hollow portion centrally formed therein, the steps of a) finding the relation between stability with respect to variations in vertical load and the width of the rigid plates by a critical load test or shearing test, b) finding an appropriate width for the rigid plates under design conditions (design displacement, standard surface pressure, the outer diameter of the rigid plates, secondary shape coefficient, design buckling surface pressure) from the relation, and c) computing an appropriate inner diameter for the rigid plates, thereby providing a laminated rubber support superior in stability with respect to variations in vertical load and having an appropriate shape. A laminated rubber support with a viscoelastic body or plastic body fitted in the cylindrical hollow portion has high stability and high attenuation constant provided by the design method described above.

2 Claims, 11 Drawing Sheets

_5,465,945_

LAMINATED RUBBER SUPPORT AND METHOD OF DESIGNING THE SAME

TECHNICAL FIELD

The present invention relates to a laminated rubber support and a method of designing the same and more particularly it relates to a laminated rubber support adapted to decrease acceleration to be input into structures (such as buildings, bridges, tanks and the like), apparatuses (such as electronic computers, medical apparatuses, safety apparatuses, precision machine tools, analytical instruments and the like) and artistic handicrafts by earthquakes, mechanical vibrations or traffic vibrations, and to a method of designing the same.

BACKGROUND ART

Among articles used as earthquake proofing supports for decreasing acceleration to be inputted into structures and various apparatuses is a laminated rubber support comprising rigid plates and rubber-like elastic plates alternately laminated to each other.

Such laminated rubber support, as shown in FIG. 14, has a construction in which rigid plates 1 and rubber-like elastic plates 2 are alternately laminated to each other to form a laminate 3 and the latter is centrally formed with a vertically extending cylindrical hollow portion 4. Also known is a laminated rubber support of the peripherally constrained type in which a cylindrical viscoelastic body or plastic body 5 is fitted in the cylindrical hollow portion 4 of the laminate 3 as shown in FIG. 15.

In use, such laminated rubber supports having that construction are interposed between a superstructure, such as a building or floor, and a foundation or concrete slab, with attachment plates (not shown) attached to the uppermost and lowermost rigid plates 1 of each laminate.

When an earthquake or various vibrations occur, these laminated rubber supports decrease input acceleration by their tensile and compressive deformations in the vertical direction and shearing deformation in the horizontal direction to insulate buildings, various apparatuses and artistic handicrafts from earthquakes and various vibrations, thereby protecting them against earthquakes and various vibrations.

As for the performance of the laminated rubber supports, the stability of the laminated rubber support with respect to variations in vertical load depends largely on the inner diameter of the rigid plates 1 of the laminate 3. In the case of the laminated rubber support shown in FIG. 14, an increase in the inner diameter makes it possible to provide an earthquake proofing support whose vertical spring constant is lower (the earthquake proofing performance and vibration preventing performance are better) and saves the amount of rubber material to be used and thus lowers the cost of material. However, if the inner diameter is increased, the laminated rubber support tends to buckle even under a small amount of deformation when it is subjected to horizontal shearing deformation. That is, the size of the inner diameter has opposite effects on the vertical spring constant and the buckling performance. In the case of the laminated rubber support of the peripherally constrained type (see FIG. 15) in which a cylindrical viscoelastic body or plastic body 5 is fitted in the cylindrical hollow portion 4 of the laminate 3, if the inner diameter is decreased in order to improve the stability with respect to variations in vertical load upon horizontal great deformation, the volume of the viscoelastic body or plastic body 5 is decreased, making it impossible to obtain the required amount of attenuation. In such a laminated rubber support, the size of the inner diameter of the rigid plates 1 of the laminate 3 has opposite effects on the attenuation performance and the buckling performance; thus, it influences the two performances in opposite manners.

In designing the laminated rubber support described above, the inner diameter of the rigid plates 1 of the laminate 3 has been empirically determined through lack of appropriate means for determining it; thus, in the existing circumstances, there is no method of appropriately designing laminated rubber supports.

More particularly, it has been impossible to design a laminated rubber support superior in earthquake proofing performance and vibration preventing performance in the vertical direction, having a high buckling surface pressure and an appropriate inner diameter. Particularly in the case of the laminated rubber support having a viscoelastic body or plastic body fitted in the cylindrical hollow portion 4 of the laminate 3, the design of a laminated rubber support which highly attenuates under design conditions and which has the highest bucking surface pressure has not been definite.

Accordingly, the present invention, which is proposed in view of the above problems, is intended to disclose appropriate means for universally determining the inner diameter of the rigid plates of the laminate and to provide a laminated rubber support having an appropriate shape and a method of designing the same.

DISCLOSURE OF THE INVENTION

As technical means for achieving the aforesaid object, the present invention provides a method of designing a laminated rubber support comprising rigid plates and rubber-like elastic plate which are alternately laminated to each other to form a laminate having a vertically extending hollow portion centrally formed therein, said method being characterized by the steps of measuring buckling loads on some laminated rubber supports different in the outer and inner sizes of the rigid plates from critical load tests or shearing tests, deriving buckling surface pressures by dividing the buckling load by the pressure support area, drawing an approximate curve indicating the relation of [buckling surface pressure/secondary shape coefficient] to [rigid plate width/design displacement] in an X-Y coordinate system using the individual buckling surface pressures and the secondary shape coefficients of the laminated rubber supports, rigid plate widths and design displacement used to derive said buckling surface pressures, finding the intersection between said approximate curve and a straight line drawn parallel with the axis of [rigid plate width/design displacement] from a value obtained by dividing the buckling surface pressure required by the laminated rubber support to be manufactured by the secondary shape coefficient of said intended laminated rubber support, and finding the maximum internal size of the rigid plates from their external size by using as the minimum width the width of the rigid plates found by multiplying the value of [rigid plate width/design displacement] found from said intersection by the design displacement.

Further, a laminated rubber support designed by said design method wherein rigid plates and rubber-like elastic plates are alternately laminated to each other to form a laminate having a vertically extending hollow portion centrally formed therein, and a laminated rubber support having a viscoelastic body or plastic body fitted in said hollow portion are characterized in that the internal size of the rigid plates is derived from the external size of the rigid plates on the basis of the width of the rigid plates determined in a region which satisfies $$\sigma_B/S \leq A_4 + A_2[(W/X_0) + B_1]^{-0.5} + A_3(W/X_0)$$

$$\sigma_B/S \geq A_5 + A_2[(S/X_0) + B_2]^{-0.5} + A_3(S/X_0)$$

(where $A_2$, $A_3$, $A_4$, $A_5$, $B_1$, $B_2$ are constants)

$$\sigma_B/S \geq \sigma_s/S$$

$$0 < W \leq D_0/2$$

where W is the width of the rigid plates, S is the secondary shape coefficient, $\sigma_0$ is the standard surface pressure, $X_0$ is the design displacement, a is the safety factor, $\sigma_B$ is the buckling surface pressure, $\sigma_s$ is the design buckling surface pressure, and $D_0$ is the external size of the rigid plates.

In the present invention, the relation between the stability with respect to variations in vertical load on the laminated rubber support and the width of the rigid plates is found by critical load tests or shearing tests and the appropriate rigid plate width under design conditions (design displacement, standard surface pressure, external size of the rigid plate and the secondary shape coefficient) is found from the relation obtained by said tests and the appropriate internal size of the rigid plates is then found, thereby designing a laminated rubber support which is superior in stability with respect to variations in vertical load and which has an appropriate shape. A laminated rubber support having a viscoelastic body or plastic body fitted in said hollow portion has a high safety and a high attenuation constant provided by said design method.

According to the design method of the present invention, in the case of a laminated rubber support comprising rigid plates and rubber-like elastic plates which are alternately laminated to each other to form a laminate having a vertically extending hollow portion centrally formed therein, it is possible to design an optimum laminated rubber support having a high stability with respect to variations in vertical load and also having an appropriate shape. Further, a laminated rubber support of the present invention having a viscoelastic body or plastic body fitted in said hollow portion has a high stability (with respect to variations in vertical load) and a high attenuation constant; thus, a laminated rubber support particularly superior in performance can be realized, the practical value being very high.

BEST MODE FOR EMBODYING THE INVENTION

Figure 1A:
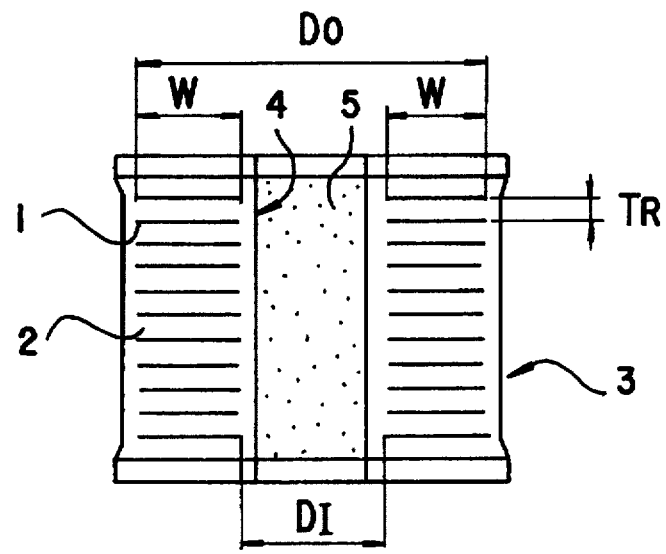
FIG. 1 shows sectional views for explaining laminated rubber supports according to the present invention and a method of designing the same, in which (a) is a sectional view of a laminated rubber support having a viscoelastic body or plastic body fitted in a cylindrical hollow portion and (b) is a sectional view of a laminated rubber support having no viscoelastic body or plastic body fitted in a hollow portion.

A method for designing laminated rubber supports according to the present invention will now be described.

A method for designing laminated rubber supports according to the present invention comprises, in a laminated rubber support comprising rigid plates 1 and rubber-like elastic plates 2 alternately laminated to each other to form a laminate 3 having a vertically extending cylindrical hollow portion 4 centrally formed therein, the steps of evaluating the stability with respect to variations in vertical load on the laminated rubber support, finding the relation between the stability and the width W of the rigid plates 1 by a critical load test or shearing test (by an approximate curve obtained from a critical load test or shearing test), finding an appropriate width (minimum width) for the rigid plates 1 under design conditions (design displacement, standard surface pressure, the outer diameter of the rigid plates 1, secondary shape coefficient, design buckling surface pressure) from the relation, and deriving an appropriate inner diameter $D_I$ (maximum inner diameter) for the rigid plates 1, thereby providing a laminated rubber support having an appropriate shape. In the case where a viscoelastic body or plastic body 5 is fitted in the cylindrical hollow portion 4 of the laminated rubber support having an appropriate shape provided by the design method of the present invention, a laminated rubber support having a maximum amount of attenuation (see FIG. 1(a)) can be realized. Further, even if such a viscoelastic body or plastic body is not fitted in the cylindrical hollow portion, a laminated rubber support superior in vertical vibration preventing performance (see FIG. 1(b)) can be realized. In addition, the inner diameter $D_I$ of the rigid plates 1 can be computed by subtracting twice the width W of the rigid plates 1 from the outer diameter $D_0$ of the rigid plates 1.

In the method of the invention, in order to know the influences on the stability with respect to variations in vertical load on the laminated rubber support, buckling load (to be later described) will be found by conducting a critical load test or shearing test described below.

Figure 2:
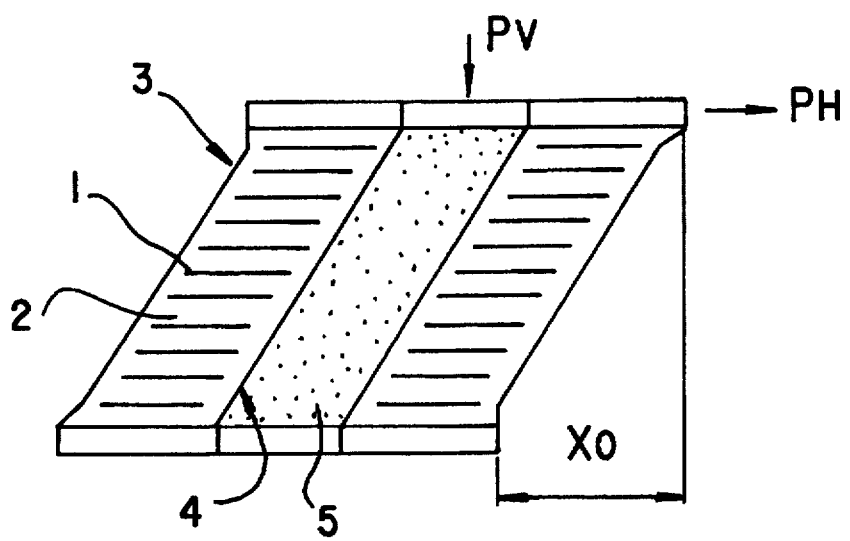
FIG. 2 is a sectional view showing a laminated rubber support carrying a vertical load in the state in which it is horizontally deformed in a critical load test.
Figure 3:
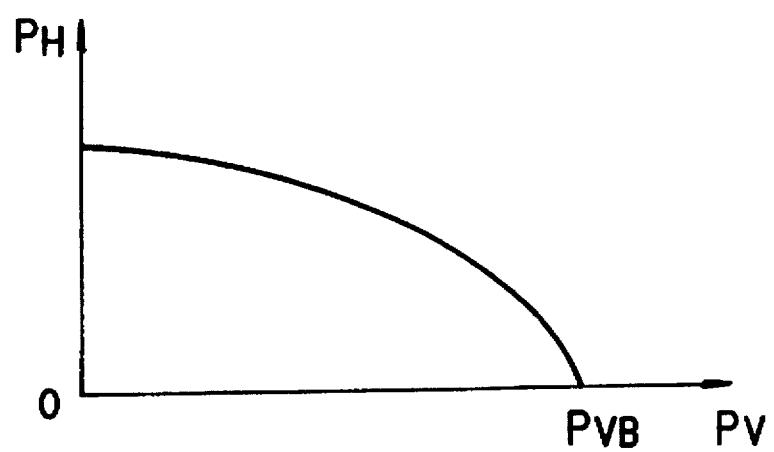
FIG. 3 is a characteristic graph showing the relation between vertical load and horizontal reaction in a critical load test on a laminated rubber support.
Figure 4A:
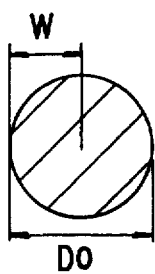
FIGS. 4(a)–4(k) are plan views for explaining the pressure receiving area of a laminated rubber support.
Figure 4B:
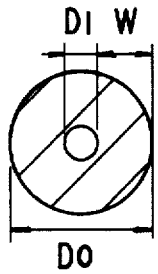
Figure 4C:
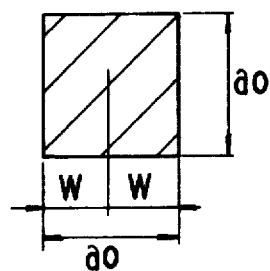
Figure 4D:
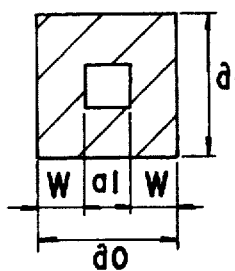
Figure 4E:
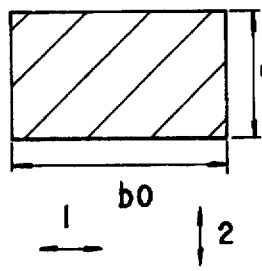
Figure 4F:
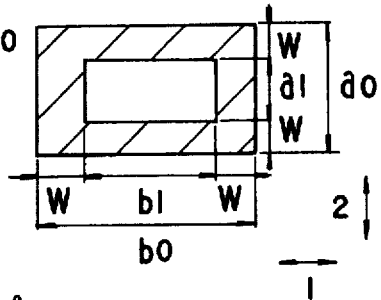
Figure 4G:
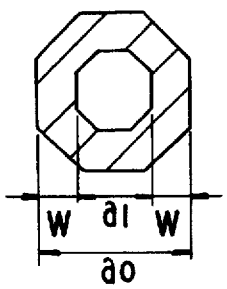
Figure 4H:
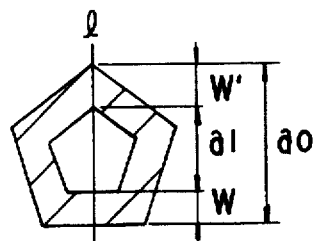
Figure 4I:
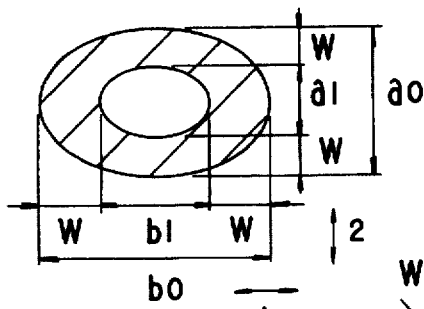
Figure 4J:
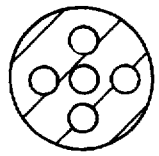
Figure 4K:
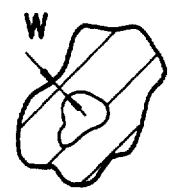

First, the critical load test will now be described. This critical load test is conducted by placing a vertical load $P_V$ on a laminated rubber support in the state in which the latter is horizontally displaced by an amount of design displacement $X_0$ as shown in FIG. 2, and examining the relation between the vertical load $P_V$ and the horizontal reaction $P_H$ to find the vertical load present when the horizontal reaction=0 as shown in FIG. 3 (which vertical load is hereinafter referred to as buckling load $P_{VB}$). And the value obtained by dividing the buckling load $P_{VB}$ measured in this test by the pressure receiving area is hereinafter referred to as buckling surface pressure $\sigma_B$. As shown in FIGS. 4(a) through 4(k), various forms of cross section of the laminate 3 taken in a direction (horizontal direction) orthogonal to the direction of lamination may be contemplated: for example, circular, rectangular, and polygonal cross sections. In this case, the pressure receiving area refers to the sectional area taken in a direction orthogonal to the direction of lamination of the laminate 3 as shown by shading minus the cross sectional area of the cylindrical hollow portion 4. Further, in the case where a viscoelastic body or plastic body 5 is fitted in the cylindrical hollow portion 5, when such a viscoelastic body or plastic body is supporting a vertical load, the pressure receiving area is the shaded area shown plus the sectional area of the viscoelastic body or plastic body taken in a direction orthogonal to the direction of lamination, and when the viscoelastic body or plastic body is not supporting a vertical load, the pressure receiving area is the shaded area shown alone.

The secondary shape coefficient S which is one of the design conditions for laminated rubber supports is a value obtained by dividing the outer diameter $D_0$ of the rigid plates 1 by the total thickness $n_R T_R$ of the rubber-like elastic plates 2 which is the product of the thickness $T_R$ of the rubber-like elastic plates 2 and the number of layers $n_R$ thereof. Thus, it follows that a laminated rubber support having a secondary shape coefficient S which is high for the total thickness $n_R T_R$ of the rubber-like elastic plates 2 has a larger outer diameter $D_0$, being less liable to buckle. Reversely, a laminated rubber support having a secondary shape coefficient S which is low means that the outer diameter $D_0$ of the rigid plates 1 is small for the total thickness $n_R T_R$ of the rubber-like elastic plates 2, being more liable to buckle. The design displacement $X_0$, which is another design condition, is the largest amount of displacement conceivable in designing a laminated rubber support, which will take place when the laminate 3 is horizontally displaced under vertical load upon occurrence of an earthquake. The standard surface pressure $\sigma_0$ associated with this design displacement is a vertical load on a unit area of the laminated rubber support and is obtained by dividing the buckling surface pressure $\sigma_B$ by the safety factor a. That is, the buckling surface pressure $\sigma_B$ divided by the fixed safety constant a with this standard surface pressure $\sigma_B$ taken into account is the design buckling surface pressure $\sigma_0$. The safety factor a is a magnification used to determine the design buckling surface pressure $\sigma_S$ so as to prevent buckling in anticipation of an increase in vertical load due to a locking phenomenon in the structure with respect to the standard surface pressure. Usually, the safety factor a is unity or more, $\sigma \geq a \cdot \sigma_0$. Preferably, the safety factor a=1.5 to 3.

Figure 5:
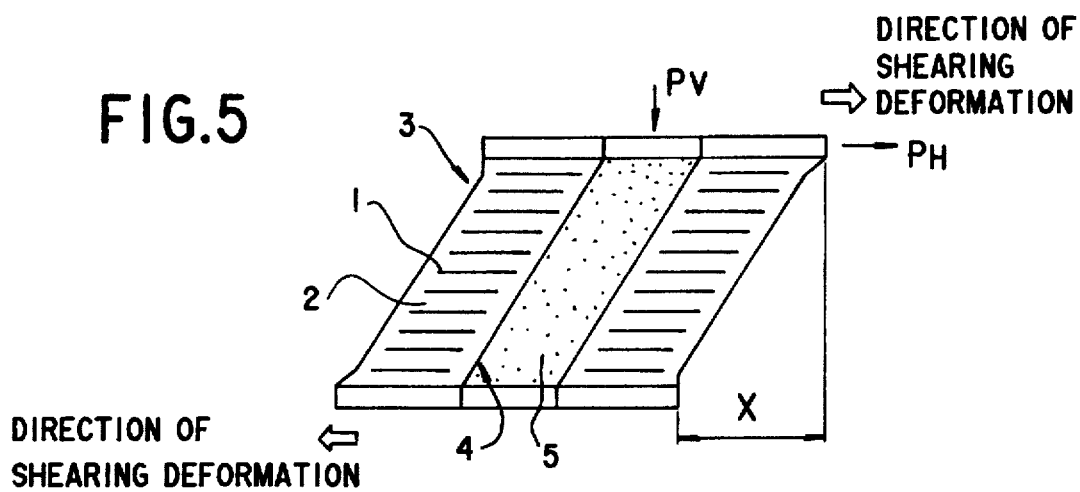
FIG. 5 is a sectional view showing a laminated rubber support horizontally deformed under vertical load during a shearing test.
Figure 6:
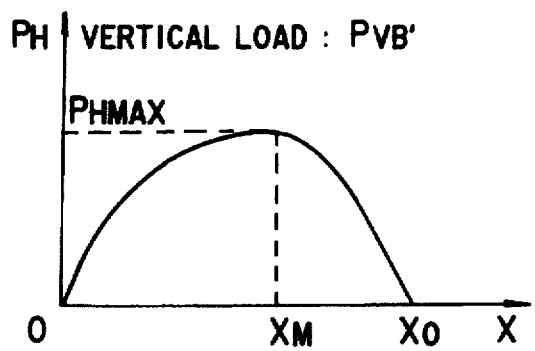
FIG. 6 is a characteristic graph showing the relation between shearing displacement and horizontal reaction produced during a shearing test on a laminated rubber support whose rubber-like elastic plates are made of a material which produces less crystallization due to tensile deformation.
Figure 7:
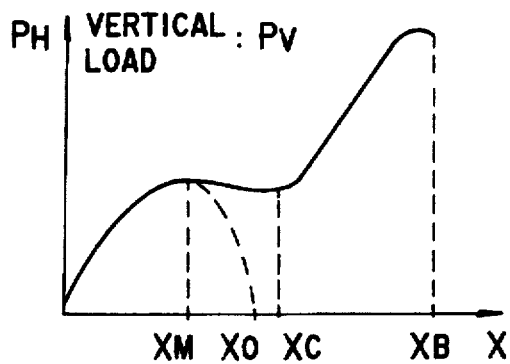
FIG. 7 is a characteristic graph showing the relation between shearing displacement and horizontal reaction produced during a shearing test on a laminated rubber support whose rubber-like elastic plates are made of a material which produces more crystallization due to tensile deformation.

The shearing test will now be described. In the shearing test, as shown in FIG. 5, the laminated rubber support is horizontally displaced in the state in which a fixed vertical load $P_V$ is placed on the laminated rubber support, and the relation between the resulting shearing displacement X and the resulting horizontal reaction $P_H$ is examined to find the shearing displacement $X_0$ which is obtained when the horizontal reaction $P_H$=0 as shown in FIG. 6. If this shearing displacement is equal to the design displacement which is a design condition, then the vertical load $P_V$ is the buckling load $P_{VB}'$ at the design displacement $X_0$. The buckling surface pressure $\sigma_B'$ is found by performing computation in the same manner as in the critical load test. The relation between the shearing displacement X and horizontal reaction $P_H$ in a shearing test on a laminated rubber support whose rubber-like elastic plates are made of a material which produces less crystallization due to tensile deformation is as shown in FIG. 6 wherein when the shearing displacement is $X_M$, the horizontal reaction takes the maximum value $P_{HMAX}$ and when the shearing displacement exceeds $X_M$, the horizontal reaction $P_H$ gradually decreases until it becomes 0 at the shearing displacement $X_0$. However, the relation between the shearing displacement X and horizontal reaction $P_H$ in a shearing test on a laminated rubber support whose rubber-like elastic plates are made of a material which produces more crystallization due to tensile deformation is as shown in FIG. 7 wherein at the shearing displacement $X_C$ or above (when the rubber-like elastic plates are made of highly attenuating natural rubber, usually $X_0 < X_C$), the shearing modulus of the rubber-like elastic plates is increased by the crystallization of the rubber-like elastic plates. As a result, the horizontal reaction $P_H$ increases as the shearing displacement X increases, as shown in solid lines in the figure, until the laminated rubber support fractures at the shearing displacement $X_B$. The broken line in the figure shows the relation between the shearing displacement and the horizontal reaction in the case where the rubber-like elastic plates produce less crystallization due to tensile deformation. Since the increase in shearing modulus is low because of less crystallization, the horizontal reaction $P_H$ is 0 at the shearing displacement $X_0$, so that the buckling load $P_{VB}'$ can be found. However, in the case of FIG. 7, it is difficult to measure the design displacement $X_0$ directly by a shearing test, making it impossible to find the buckling load. In the critical load test, since the test is started at the displacement $X_0$ which is less than the shearing displacement $X_C$ at which crystallization starts, the buckling load can be measured with little or no crystallization of the rubber-like elastic plates. Further, the buckling surface pressure $\sigma_B$' at the design displacement $X_0$ found by the critical load test has substantially the same value as that of the buckling surface pressure $\sigma_B$ found by the critical load test. The buckling surface pressure can be found by the critical load test and also by the shearing test; each test will do. We have found said buckling surface pressure by the critical load test which is less influenced by an increase in shearing modulus due to crystallization of the rubber-like elastic plates and which allows the buckling surface pressure $\sigma_B$ to be measured with ease. The results obtained will now be described.

Figure 8:
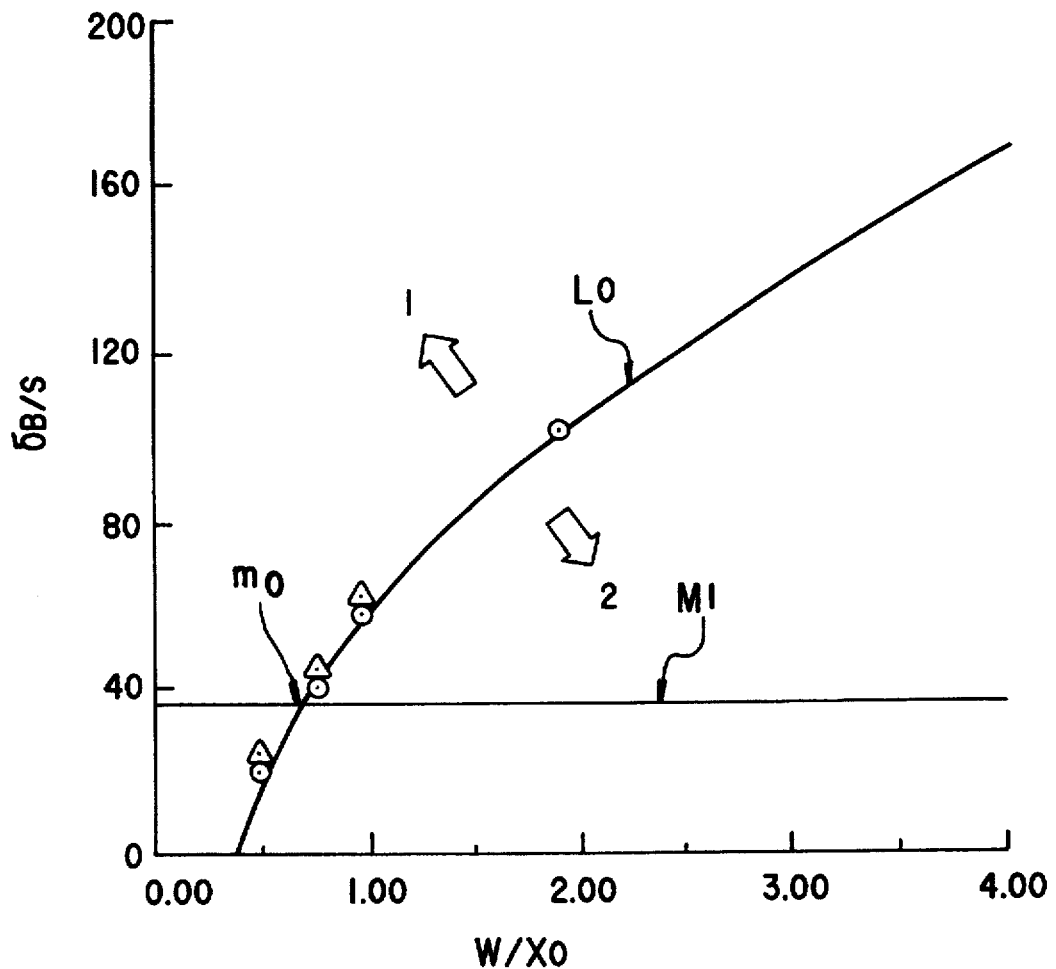
FIG. 8 is a characteristic graph showing the relation of [buckling surface pressure/secondary shape coefficient] to [rigid plate width/design displacement] obtained by a critical load test we have conducted.

FIG. 8 shows the relation between the buckling surface pressure $\sigma_B$ found from the buckling load $P_{VB}$ obtained by the critical load test we have conducted and the width W of the rigid plates 1 of the laminated rubber support. In the characteristic graph in FIG. 8, since the buckling surface pressure $\sigma_B$ varies with the value of the design displacement $X_0$, the width W/design displacement $X_0$ rather than the width W of the rigid plates 1 is plotted on the horizontal axis to avoid dependence on the design displacement $X_0$, and since the buckling surface pressure $\sigma_B$ varies with the value of the secondary shape coefficient S, the buckling surface pressure $\sigma_B$/secondary shape coefficient S rather than the buckling surface pressure $\sigma_B$ is plotted on the vertical axis to avoid dependence on the secondary shape coefficient S.

The data we obtained by the critical load test are shown in the table below, and the approximate curve $L_0$ to be later described is found from these data. In addition, in Table 1, the data shown in the first through fourth columns relate to laminated rubber supports (see FIG. 1(a)) each having a viscoelastic body or plastic body 5 fitted in the cylindrical hollow portion 4, and the data shown in the fifth through seventh columns relate to laminated rubber supports (see FIG. 1(b)) each having no viscoelastic body or plastic body 5 fitted in the cylindrical hollow portion 4.

TABLE 1

| | | | | | | | |
|---|---|---|---|---|---|---|---|
| Outer dia. of rigid plates, $D_O$ mm | 180 | 180 | 303 | 303 | 180 | 180 | 303 |
| Inner dia. of rigid plates, $D_I$, mm | 66 | 102 | 16 | 158 | 66 | 102 | 158 |
| Width of rigid plates, W mm | 57 | 39 | 143.5 | 72.5 | 57 | 39 | 72.5 |
| Buckling load, $P_{VB}$ tf | 42.2 | 19.8 | 491 | 280 | 37.4 | 14.7 | 210 |
| Buckling surface pressure, $\sigma_B$ kgf/cm² | 166 | 78 | 681 | 389 | 170 | 85 | 400 |
| Secondary shape coefficient S | 4 | 4 | 6.7 | 6.7 | 4 | 4 | 6.7 |
| Design displacement, $X_0$ mm | 75 | 75 | 75 | 75 | 75 | 75 | 75 |
| $\sigma_B/S$ | 41.5 | 19.5 | 102 | 58.1 | 42.5 | 21.3 | 59.7 |
| $W/X_0$ | 0.76 | 0.52 | 1.91 | 0.97 | 0.76 | 0.52 | 0.97 |

From the data in Table 1, it is seen that [buckling surface pressure $\sigma_B$/secondary shape coefficient S] relative to [rigid plate width W/design displacement $X_0$] is the curve $L_0$ in FIG. 8. In the figure, the circle marks refer to the laminated rubber supports (see FIG. 1(a) each having a viscoelastic body or plastic body 5 fitted in the cylindrical hollow portion 4, and the triangle marks refer to the laminated rubber supports (see FIG. 1(b)) each having no viscoelastic body or plastic body 5 fitted in the cylindrical hollow portion 4. The approximate formula for this curve $L_0$ is $$\sigma_B/S = A_1 + A_2 \cdot (W/W_0)^{-0.5} + A_3 \cdot (W/X_0).$$

In this case, $A_1 = 106.7$, $A_2 = -72.48$, $A_3 = 24.65$, $0 < W \leq D_0/2$, and $X_0 > 0$.

The approximate curve $L_0$ given by the above approximate formula indicates the limit of allowable design, and the [design surface pressure $\sigma_S$/secondary shape coefficient S], which is equal to the value obtained by dividing the design buckling surface pressure, which is equal to the standard surface pressure $\sigma_0$ multiplied by the fixed safety factor a, by the secondary shape coefficient S, is the straight line $M_1$ in FIG. 8 represented by $$\sigma_B/S = \sigma_S/S.$$

In this case, $\sigma_0 = 50$ kgf/cm², $S = 6.7$ and hence $\sigma_S/S = 22.4$.

As a result, the width W of the rigid plates 1 determined by the intersection $M_0$ between the straight line $M_1$ and the approximate curve $L_0$ is the minimum value determined by the design conditions described above, and the inner diameter $D_I$ of the rigid plates 1 found from this minimum width $W_{MIN}$ is the maximum value; thus, the maximum inner diameter $D_{IMAX}$ is determined. In this manner, it is possible to design an optimum laminated rubber support under design conditions which is stable with respect to variations in vertical load and whose rigid plates 1 have the maximum inner diameter $D_{IMAX}$. The minimum width $W_{MIN}$ of the rigid plates 1 is the minimum value determined by the design conditions. If the width W of the rigid plates 1 which is greater than the minimum width $W_{MIN}$ of the rigid plates 1 lies in a region surrounded by the straight line $M_1$ and approximate curve $L_0$ expressed by the formulas $$\sigma_B/S \leq A_1 + A_2 \cdot (W/X_0)^{-0.5} + A_3 \cdot (W/X_0)$$

$$\sigma_B/S \geq \sigma_S/S,$$

then a laminated rubber support which is stable with respect to variations in vertical load and which has an appropriate shape can be designed under design conditions.

As described above, the approximate curve $L_0$ required for designing under design conditions a laminated rubber support which is stable with respect to variations in vertical load and which has an appropriate shape is obtained by the critical load test we have conducted.

For example, we have conducted a critical load test on a laminated rubber support whose rubber-like elastic plates 2 have a thickness of 6 mm and a modulus of elasticity of 7 kgf/cm² and whose rigid plates 1 have a thickness of 3.2 mm and a modulus of elasticity of $2.1 \times 10^6$ kgf/cm², thereby obtaining the approximate curve $L_0$.

The approximate curve $L_0$ changes and moves as it is influenced by the thickness and modulus of elasticity of the rubber-like elastic plates 2 and the thickness and modulus of elasticity of the rigid plates 1.

When the thickness of the rubber-like elastic plates 2 is less than that of the rubber-like elastic plates 2 of the laminated rubber support used to find the approximate curve $L_0$ or when the modulus of elasticity of the rubber-like elastic plates 2 is greater than that of the rubber-like elastic plates 2 of the laminated rubber support used to find the approximate curve $L_0$, the approximate curve $L_0$ moves upward (the arrow mark (1) in FIG. 8). Further, when the thickness of the rigid plates 1 is greater than that of the rigid plates 1 of the laminated rubber support used to find the approximate curve $L_0$ or when the modulus of elasticity of the rigid plates 1 is greater than that of the rigid plates 1 of the laminated rubber support used to find the approximate curve $L_0$, the approximate curve $L_0$ likewise moves upward (the arrow mark (1) in FIG. 8).

When the thickness of the rubber-like elastic plates 2 is greater than that of the rubber-like elastic plates 2 of the laminated rubber support used to find the approximate curve $L_0$ or when the modulus of elasticity of the rubber-like elastic plates 2 is less than that of the rubber-like elastic plates 2 of the laminated rubber support used to find the approximate curve $L_0$, the approximate curve $L_0$ moves downward (the arrow mark (2) in FIG. 8). Further, when the thickness of the rigid plates 1 is less than that of the rigid plates 1 of the laminated rubber support used to find the approximate curve $L_0$ or when the modulus of elasticity of the rigid plates 1 is less than that of the rigid plates 1 of the laminated rubber support used to find the approximate curve $L_0$, the approximate curve $L_0$ likewise moves downward (the arrow mark (2) in FIG. 8).

Therefore, in the laminated rubber support obtained by the design method of the present invention, the thickness and modulus of elasticity of the rubber-like elastic plates 2 and rigid plates 1 have to be taken into account.

Thus, the shape of the laminated rubber support with said conditions taken into account will now be described. In the case where said laminated rubber support is used as an earthquake proofing support, it may or may not have a viscoelastic body or plastic body 5 fitted in the cylindrical rigid plates 1 and rubber-like elastic plates 2.

Figure 9:
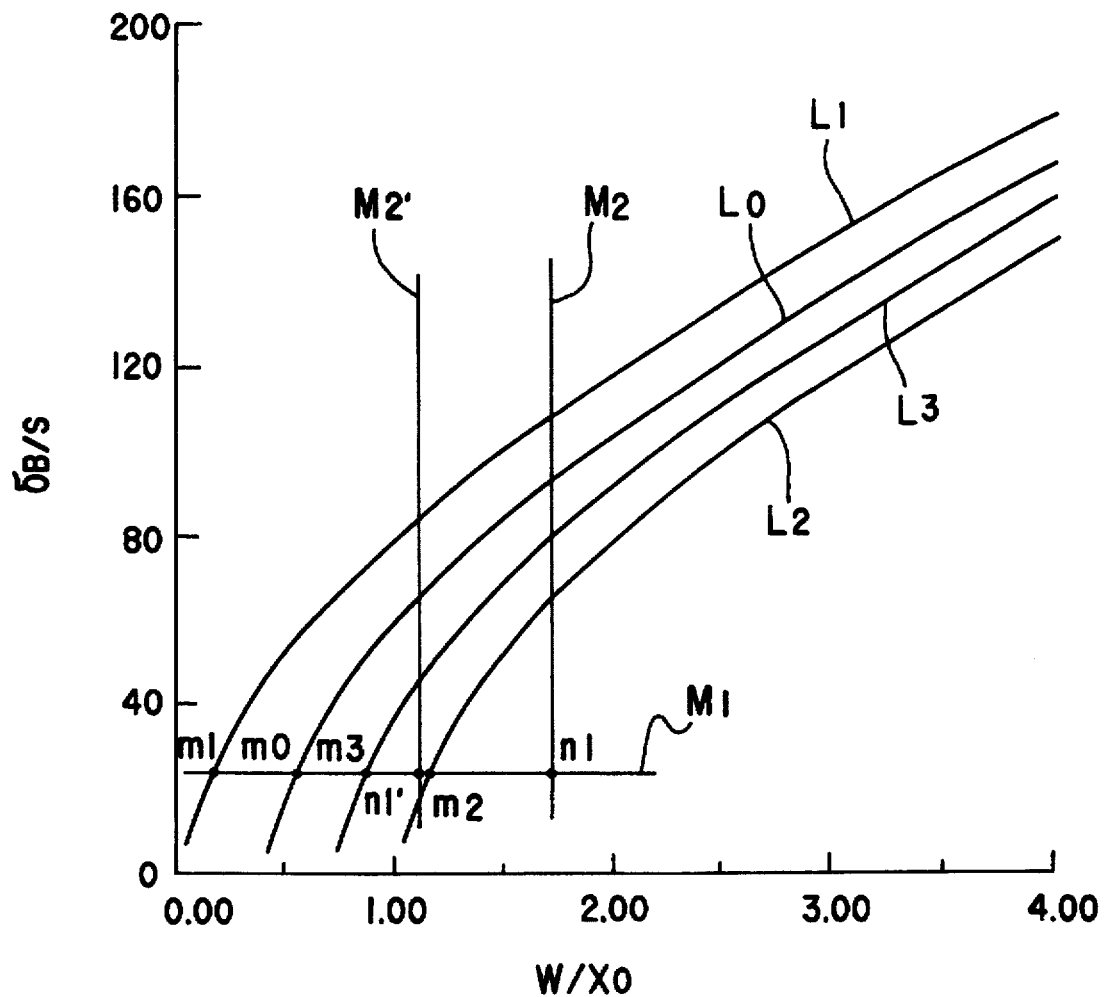
FIG. 9 is a characteristic graph showing the relation of [buckling surface pressure/secondary shape coefficient] to [rigid plate width/design displacement] obtained by a critical load test we have conducted for explaining a laminated rubber support serving as an earthquake proofing support designed by the method of the invention.

FIG. 9 shows the relation between [buckling surface pressure $\sigma_B$/secondary shape coefficient S] with respect to [rigid plate width W/design displacement $X_C$] obtained by taking into account the thickness and modulus of elasticity of the rubber-like elastic plates 2, the thickness and the modulus of elasticity of the rigid plates 1 and values desirable for a laminated rubber support. In the case where the thickness and modulus of elasticity of the rubber-like elastic plates 2, the thickness and the modulus of elasticity of the rigid plates 1 and values desirable for a laminated rubber support are taken into account, curves $L_1$ and $L_2$ have been obtained as the limits of allowable design as shown in FIG. 9. The approximate formula of this curve $L_1$ is $$\sigma_B/S = A_4 + A_2 \cdot |(W/W_0) + B_1|^{-0.5} + A_3 \cdot (W/X_0).$$

In this case, $A_4=116.289$, $A_2=-72.48$, $A_3=24.65$, $B_1=0.389$, $0 < W \leq D_0/2$.

The approximate formula of the curve $L_2$ is $$\sigma_B/S = A_5 + A_2 \cdot |(W/W_0) + B_2|^{-0.5} + A_3 \cdot (W/X_0).$$

In this case, $A_5=91.64$, $A_2=-72.48$, $A_3=24.65$, $B_2=-0.611$, $0 < W \leq D_0/2$.

When the thickness of the rubber-like elastic plates 2 is less than that of the rubber-like elastic plates 2 of the laminated rubber support used to find the approximate curve $L_1$, to provide appropriate horizontal rigidity and vertical rigidity, the number of layers has to be increased, leading to an increase in production cost. Further, the vertical rigidity becomes great for the horizontal rigidity (the ratio of the vertical rigidity to the horizontal rigidity of an ordinary laminated rubber support is 1000:1), leading to decreases in vertical earthquake proofing performance and vibration preventing performance. When the modulus of elasticity of the rubber-like elastic plates 2 is greater than that of the rubber-like elastic plates 2 of the laminated rubber support used to find the approximate curve $L_1$, the number of layers has to be increased, leading to an increase in production cost. When the thickness of the rigid plates 1 is greater than that of the rigid plates 1 of the laminated rubber support used to find the approximate curve $L_1$, the weight of the support increases, increasing the transport cost. If a material whose modulus of elasticity is greater than that of the rigid plates 1 of the laminated rubber support used to find the approximate curve $L_1$ is used for the rigid plates 1, the material cost increases.

When the thickness of the rubber-like elastic plates 2 is greater than that of the rubber-like elastic plates 2 of the laminated rubber support used to find the approximate curve $L_2$, the width W of the rigid plates 1 increases with respect to the design conditions. Therefore, if the inner diameter $D_I$ of the rigid plates 1 is increased to obtain a high attenuation constant, the outer diameter $D_0$ of the rigid plates increases, leading to an increase in production cost. The vertical rigidity decreases as compared with the horizontal rigidity (the ratio of the vertical rigidity to the horizontal rigidity of an ordinary laminated rubber support is 1000:1), leading to a decrease in vertical load supporting capacity, a fact which is undesirable for laminated rubber supports. When the modulus of elasticity of the rubber-like elastic plates 2 is less than that of the rubber-like elastic plates 2 of the laminated rubber support used to find the approximate curve $L_2$, the number of layers decreases, leading to an increase in strains produced in the rubber-like elastic plates 2 during design displacement, thus requiring a rubber material having a high break elongation. When the thickness of the rigid plates 1 is less than that of the rigid plates 1 of the laminated rubber support used to find the approximate curve $L_2$, the rigid plates 1 tend to easily develop plastic deformation owing to the shearing stress and compressive stress in the rubber-like elastic plates 2. When the modulus of elasticity of the rigid plates 1 is less than that of the rigid plates 1 of the laminated rubber support used to find the approximate curve $L_2$, the rigid plates 1 likewise tend to easily develop plastic deformation owing to the shearing stress and compressive stress in the rubber-like elastic plates 2, leading to a great decrease in buckling surface pressure, a fact which is undesirable for laminated rubber supports.

When the outer diameter $D_0$ of the rigid plates 1 is determined from $0 < \leq D_0/2$, half of said outer diameter $D_0$ is automatically determined as the designable maximum value of the width W of the rigid plates 1 and the limit of such maximum value is the straight line $M_2$ of FIG. 9 represented by $$W/X_0 = D_0/2X_C.$$

Further, as described above, if the conditions that [design surface pressure $\sigma_s$/secondary shape coefficient S] is the straight line $M_1$ of FIG. 9 represented by $$\sigma_B/S = \sigma_s/S$$

and that it is in the region surrounded by the straight lines $M_1$ and $M_2$ and the approximate curves $L_1$ and $L_2$ represented by $$\sigma_B/S \leq A_4 + A_2|(W/X_0) + B_1|^{-0.5} + A_3(W/X_0)$$

$$\sigma_B/S \geq A_5 + A_2|(S/X_0) + B_2|^{-0.5} + A_3(W/X_0)$$

$$\sigma_B/S \geq \sigma_s/S$$

$$W < X_0 \leq D_0/2X_0$$

are met, then a laminated rubber support serving as an earthquake proofing support stable with respect to variations in vertical load, having an appropriate shape and superior in attenuation performance can be designed under design conditions. Particularly, an optimum laminated rubber support serving as an earthquake proofing support can be designed under design conditions and on the line segment $m_1$-$m_2$ determined by the intersections $m_1$ and $m_2$ between the approximate curves $L_1$, $L_2$ and the straight line $M_1$.

In addition, if outside said region, that is, if $$\sigma_B/S > A_4 + A_2[(W/X_0)+B_1]^{-0.5} + A_3(W/X_0),$$

then the buckling performance decreases, and if $$\sigma_B/S < A_5 + A_2[(S/X_0)+B_2]^{-0.5} + A_3(W/X_0),$$

then the attenuation performance decreases. If $$\sigma_B/S < \sigma_s/S$$

then the design buckling surface pressure $\sigma S$, that is, the safety factor a decreases, making it difficult to design a laminated rubber support serving as an earthquake proofing support whose stability with respect to variations in vertical load is high and which is superior in attenuation performance. In addition, it is out of the bounds of possibility that $X_0 > D_0/2X_0$. That is, it is out of the bounds of possibility that the width W of the rigid plates 1 is greater than half of their outer diameter $D_0$.

A curve $L_3$ has been obtained besides an approximate curve $L_0$ by a critical load test in the region surrounded by the approximate curves $L_1$ and $L_2$ using the approximate curves $L_1$ and $L_2$ as the limits of allowable design in this manner. The approximate formula of this curve $L_3$ is $$\sigma_B/S = A_6 + A_2[(W/X_0)+B_3]^{-0.5} + A_3(W/X_0).$$

In this case, $A_6 = 99.034$, $A_2 = -72.48$, $A_3 = 24.65$, $B_3 = -0.311$, $0 < W \leq D_0/2$.

In the case where the intersection $n_1$ between the straight line $M_2$ and $M_1$ shown in FIG. 9 does not satisfy $$\sigma_B/S \geq A_5 + A_2[(S/X_0)+B_2]^{-0.5} + A_3(W/X_0),$$

an appropriate laminated rubber support is designed on the condition that it is in the region surrounded by the straight lines $M_1$ and $M_2$ and approximate curves $L_1$ and $L_2$, as described above. However, as indicated by the straight line M2' shown in FIG. 9, if [rigid plate width W/design displacement $X_0$] becomes smaller and the intersection $n_1'$ between the straight lines $M_2'$ and $M_1$ satisfies the above condition, that is, $$\sigma_B/S \geq A_5 + A_2[(W/X_0)+B_2]^{-0.5} + A_3(W/X_0),$$

then it is preferable to make a design on the condition that it is in the region surrounded by the straight lines $M_1$ and $M_2'$ and approximate curves $L_1$ and $L_3$ represented by $$\alpha_B/S \leq A_4 + A_2 \cdot [(W/W_0)+B_1]^{-0.5} + A_3 \cdot (W/X_0).$$

$$\sigma_B/S \geq A_6 + A_2[(W/X_0)+B_3]^{-0.5} + A_3(W/X_0).$$

$$\sigma_B/S \geq \sigma_s/S$$

$$W/X_0 \leq D_0/2X_0.$$

Even in the case where [rigid plate width W/design displacement $X_0$] is great and the intersection $n_1$ between the straight lines $M_2$ and $M_1$ does not satisfy $$\sigma_B/S \geq A_5 + A_2[(W/X_0)+B_2]^{-0.5} + A_3(W/X_0),$$

it is preferable to make a design on the condition that it is in the region surrounded by the straight lines $M_1$ and $M_2$ and approximate curves $L_1$ and $L_3$.

Further, the maximum value of [rigid plate width W/design displacement $X_0$] is $$W/X_0 = 8$$

and the designable region is subject to satisfying $$S/X_0 \leq 8.$$

In a laminated rubber support designed in the region satisfying $$W/X_0 > 8$$

in the case where the design displacement $X_0$ is 250 mm, the width W of the rigid plates 1 is 2000 mm or above and the outer diameter $D_0$ of the rigid plates 1 is 4 m or above; usually such a gigantic laminated rubber support is not used as an earthquake proofing support.

An ideal laminated rubber support designed under optimum design conditions is on the approximate curve $L_0$ represented by $$\sigma_B/S = A_1 + A_2 \cdot (W/X_0)^{-0.5} + A_3 \cdot (W/X_0)$$

and it is at the intersection $m_0$ between the straight line $M_1$ and said approximate curve $L_0$ represented by $$\sigma_B/S = \sigma_s/S.$$

A comparison between present articles designed by the present inventive method and comparative articles as to their stability with respect to variations in vertical load and attenuation performance will now be described.

First through third comparative examples of laminated rubber supports each having a viscoelastic body or plastic body 5 fitted in a cylindrical hollow space 5 will first be described.

To start with, a first comparative example will first be described with reference to FIG. 10. Its design conditions are as follows.

| | |
|---|---|
| Design displacement | $X_O = 250$ mm |
| Standard surface pressure | $\sigma_O = 50$ kgf/cm$^2$ |
| Outer diameter of rigid plates | $D_O = 1000$ mm |
| Secondary shape coefficient | $S = 6.7$ |
| Safety factor | $a = 3$ |
| Design buckling surface pressure | $\sigma_s = a \cdot \sigma_O$ |
| | $= 150$ kgf/cm$^2$ |

Figure 10:
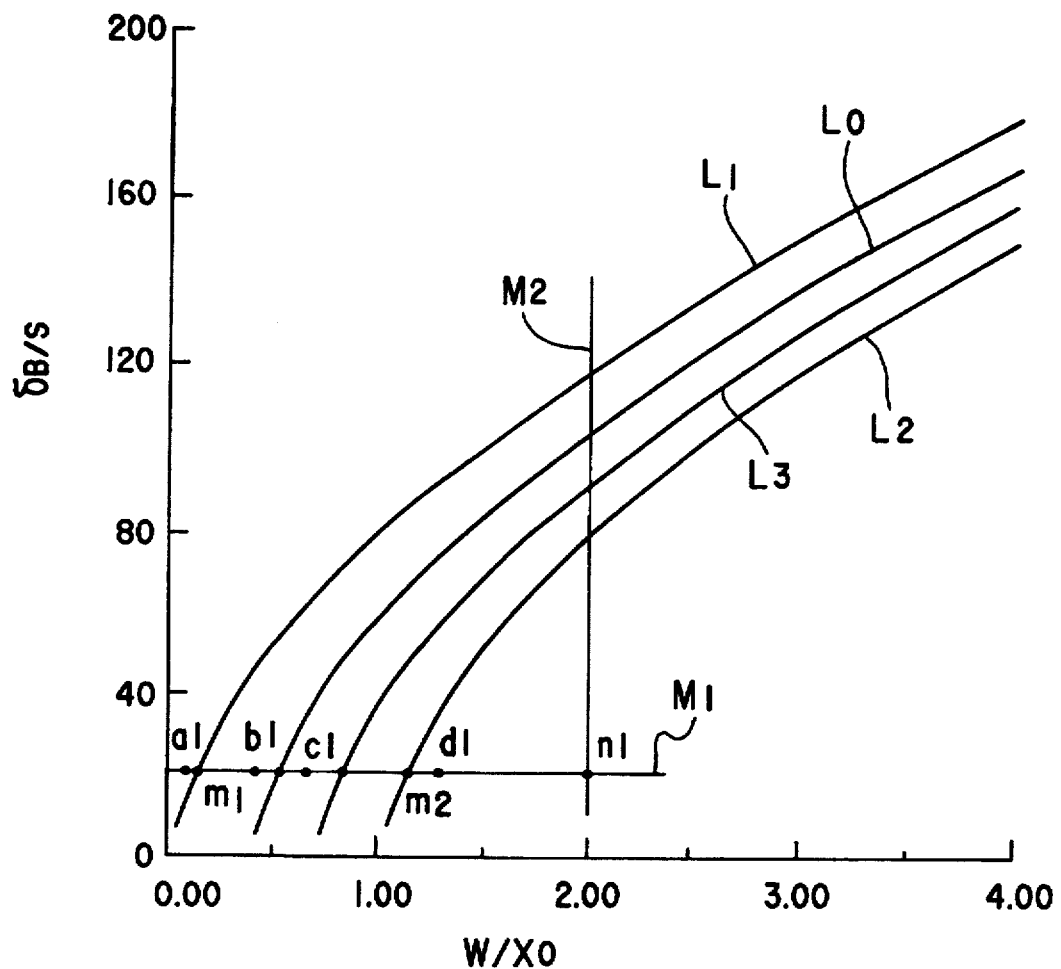
FIG. 10 is a characteristic graph showing the relation of [buckling surface pressure/secondary shape coefficient] to [rigid plate width/design displacement] in a first comparative example obtained by a critical load test we have conducted.

The straight line $M_1$ shown in FIG. 10 is obtained from said design buckling surface pressure $\sigma_S$ and secondary shape coefficient S. Further, since $0 < W \leq D_0/2$, $0 < W/X_0 \leq 2.0$, which is the straight line $M_2$ shown in FIG. 10. Since the intersection $n_1$ between said straight lines $M_1$ and $M_2$ does not satisfy $$\sigma_B/S \geq A_5 + A_2[(W/X_0)+B_2]^{-0.5} + A_3(W/X_0),$$

the present inventive articles are designed in the region surrounded by the straight lines $M_1$, $M_2$ and the approximate curves $L_1$ and $L_2$, preferably by the values of $W/X_0$ on the line segment $m_1$- $m_2$ determined by the intersections $m_1$ and $m_2$ between the approximate curves $L_1$, $L_2$ and the straight line $M_1$.

Laminated rubber supports were manufactured by finding the width W of the rigid plates 1 at points $a_1$, $b_1$, $c_1$, and $d_1$ on the straight line $M_1$ shown in FIG. 10 and they were compared. The results of confirmation of the stabilities of the laminated rubber supports with respect to variations in vertical load are shown in Table 2. In addition, the equivalent attenuation constant of the rubber-like elastic plates 2 is 15% and the equivalent attenuation constant of the viscoelastic body or plastic body 5 is 50%.

TABLE 2

| | Inner dia. of rigid plate, mm | equivalent attenuation constant, % | Buckling surface pressure $\sigma_B$ kgf/cm² |
|---|---|---|---|
| Comparative article $a_1$ | 954 | 45 | 100 |
| Comparative article $d_1$ | 346 | 18 | 630 |
| Inventive article $b_1$ | 795 | 34 | 170 |
| Inventive article $c_1$ | 716 | 30 | 300 |

As is clear from the results shown above, for the comparative article $a_1$, the buckling surface pressure found from a critical load test was 100 kgf/cm², which was less than the design buckling surface pressure (150 kgf/cm²). The laminated rubber support of this shape had poor stability with respect to variations in vertical load and could not be put to practical use. For the comparative article $d_1$, the buckling surface pressure found from a critical load test was 630 kgf/cm², which was greater than the design buckling surface pressure (150 kgf/cm²), but its equivalent attenuation constant was less than those of the inventive articles $b_1$ and $c_1$.

In contrast, the buckling surface pressure of the inventive articles $b_1$ and $c_1$ were greater than the design buckling surface pressure and their equivalent attenuation constants were also high.

Secondly, to described the second comparative example with reference to FIG. 11, the design conditions are as follows.

| | |
|---|---|
| Design displacement | $X_O = 250$ mm |
| Standard surface pressure | $\sigma_O = 50$ kgf/cm² |
| Outer diameter of rigid plates | $D_O = 600$ mm |
| Secondary shape coefficient | $S = 4.0$ |
| Safety factor | $a = 3$ |
| Design buckling surface pressure | $\sigma_s = a \cdot \sigma_O$ = 150 kgf/cm² |

Figure 11:
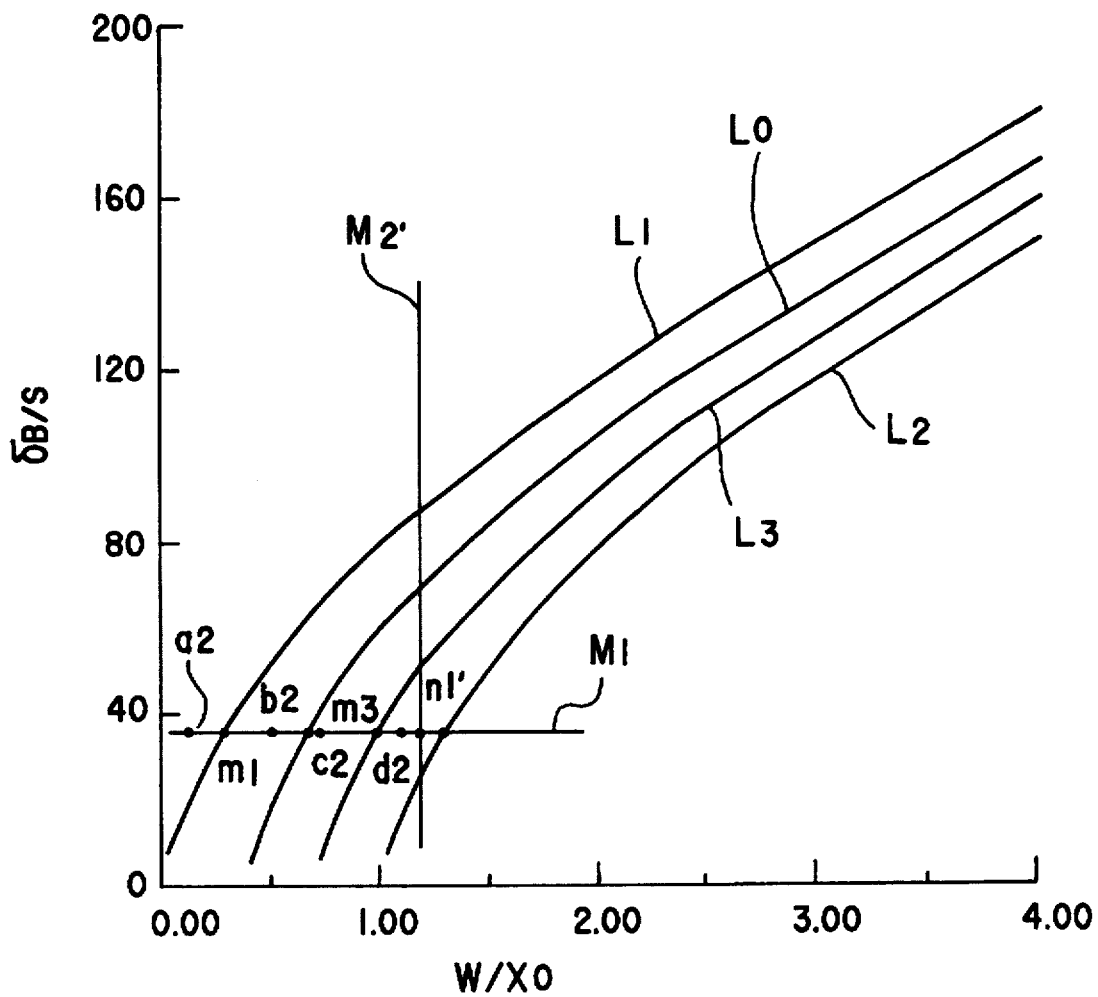
FIG. 11 is a characteristic graph showing the relation of [buckling surface pressure/secondary shape coefficient] to [rigid plate width/design displacement] in a second comparative example obtained by a critical load test we have conducted.

The straight line $M_1$ shown in FIG. 11 is obtained from said design buckling surface pressure $\sigma_s$ and secondary shape coefficient S. Further, since $0<W\leq D_0/2$, $0<W/X_0\leq 1.2$, which is the straight line $M_2'$ shown in FIG. 11. Since the intersection $n_1'$ between said straight lines $M_1$ and $M_2'$ satisfies $$\sigma_B/S \geq A_5 + A_2[(W/X_0)+B_2]^{-0.5} + A_3(W/X_0),$$

the present inventive articles are designed in the region surrounded by the straight lines $M_1$, $M_2'$ and the approximate curves $L_1$ and $L_3$, preferably by the values of $W/X_0$ on the line segment $m_1 - m_3$ determined by the intersections $m_1$ and $m_3$ between the approximate curves $L_1$, $L_3$ and the straight line $M_1$.

Laminated rubber supports were manufactured by finding the width W of the rigid plates 1 at points $a_2$, $b_2$, $c_2$, and $d_2$ on the straight line $M_1$ shown in FIG. 11 and they were compared. The results of confirmation of the stabilities of the laminated rubber supports with respect to variations in vertical load are shown in Table 3. In addition, the equivalent attenuation constant of the rubber-like elastic plates 2 is 15% and the equivalent attenuation constant of the viscoelastic body or plastic body 5 is 50%.

TABLE 3

| | Inner dia. of rigid plate, mm | equivalent attenuation constant, % | Buckling surface pressure $\sigma_B$ kgf/cm² |
|---|---|---|---|
| Comparative article $a_2$ | 516 | 38 | 30 |
| Comparative article $d_2$ | 52 | 15 | 320 |
| Inventive article $b_2$ | 341 | 24 | 160 |
| Inventive article $c_2$ | 203 | 22 | 250 |

As is clear from the results shown above, for the comparative article $a_2$, the buckling surface pressure found from a critical load test was 30 kgf/cm², which was less than the design buckling surface pressure (150 kgf/cm²). The laminated rubber support of this shape had poor stability with respect to variations in vertical load and could not be put to practical use. For the comparative article $d_2$, the buckling surface pressure found from a critical load test was 320 kgf/cm², which was greater than the design buckling surface pressure (150 kgf/cm²), but its equivalent attenuation constant was less than those of the inventive articles $b_2$ and $c_2$.

In contrast, the buckling surface pressure of the inventive articles $b_2$ and $c_2$ were greater than the design buckling surface pressure and their equivalent attenuation constants were also high.

Thirdly, to described the third comparative example with reference to FIG. 12, the design conditions are as follows.

| | |
|---|---|
| Design displacement | $X_O = 300$ mm |
| Standard surface pressure | $\sigma_O = 50$ kgf/cm² |
| Outer diameter of rigid plates | $D_O = 1500$ mm |
| Secondary shape coefficient | $S = 6.7$ |
| Safety factor | $a = 3$ |
| Design buckling surface pressure | $\sigma_s = a \cdot \sigma_O$ = 150 kgf/cm² |

Figure 12:
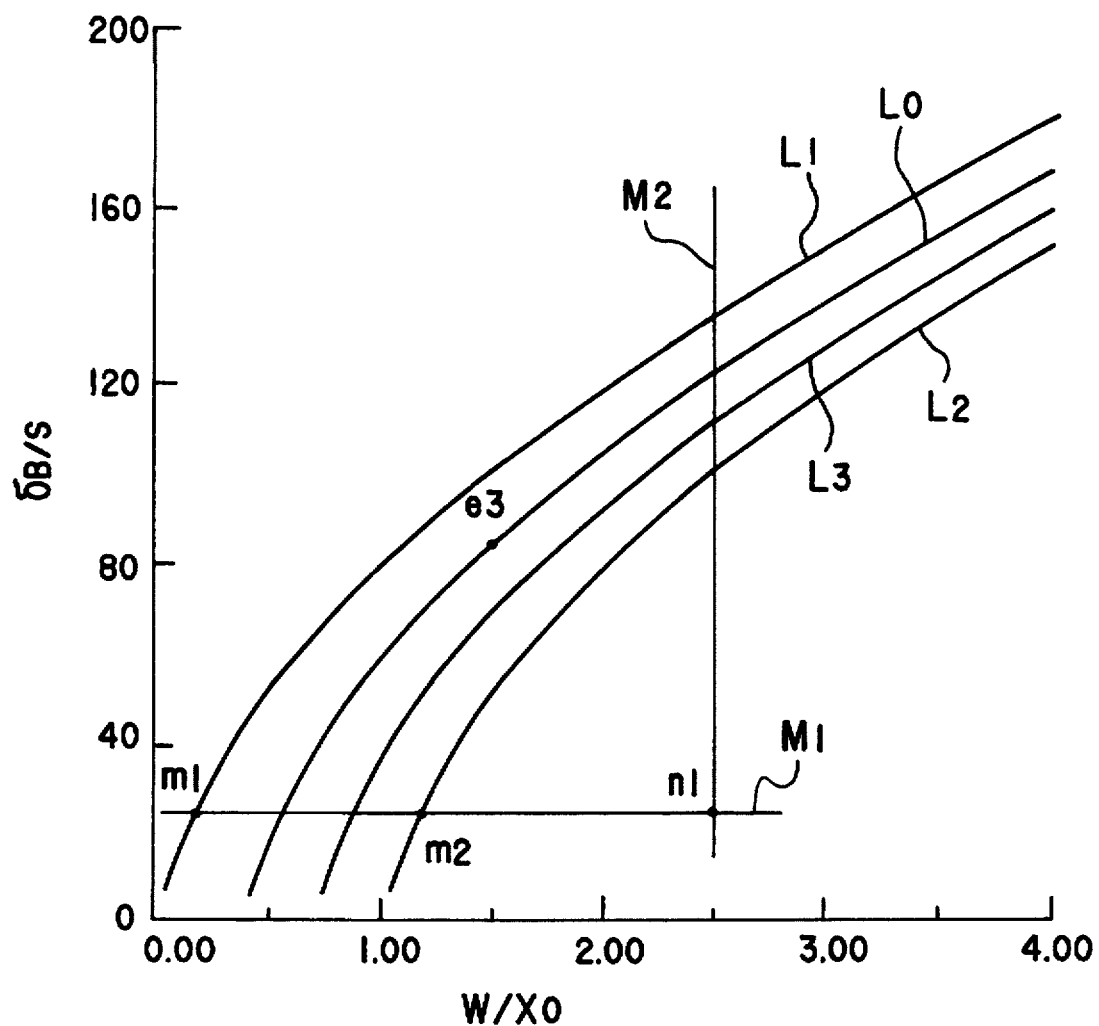
FIG. 12 is a characteristic graph showing the relation of [buckling surface pressure/secondary shape coefficient] to [rigid plate width/design displacement] in a third comparative example obtained by a critical load test we have conducted.

The straight line $M_1$ shown in FIG. 12 is obtained from said design buckling surface pressure $\sigma_s$ and secondary shape coefficient S. Further, since $0<W\leq D_0/2$, $0<W/X_0\leq 2.5$, which is the straight line $M_2$ shown in FIG. 12. Since the intersection $n_1$ between said straight lines $M_1$ and $M_2$ does not satisfy $$\sigma_B/S \geq A_5 + A_2[(W/X_0)+B_2]^{-0.5} + A_3(W/X_0),$$

the present inventive articles are designed by the values of W/XO in the region asurrounded by the straight lines $M_1$, $M_2$ and the approximate curves $L_1$ and L2.

A laminated rubber support was manufactured by finding the width W of the rigid plates 1 at point e3 on the approximate curve $L_0$ shown in FIG. 12 and it was compared. The result of confirmation of the stability of the laminated rubber support with respect to variations in vertical load is shown in Table 4. In addition, the equivalent attenuation constant of the rubber-like elastic plates 2 is 15% and the equivalent attenuation constant of the viscoelastic body or plastic body 5 is 50%.

TABLE 4

| | Inner dia. of rigid plate, mm | equivalent attenuation constant, % | Buckling surface pressure $\sigma_B$ kgf/cm² |
|---|---|---|---|
| Inventive article $e_3$ | 600 | 20 | 910 |

As is clear from the above results, the buckling surface pressure of the inventive article $e_3$ was greater than the design buckling surface pressure and its equivalent attenuation constant was also high.

Figure 1B:
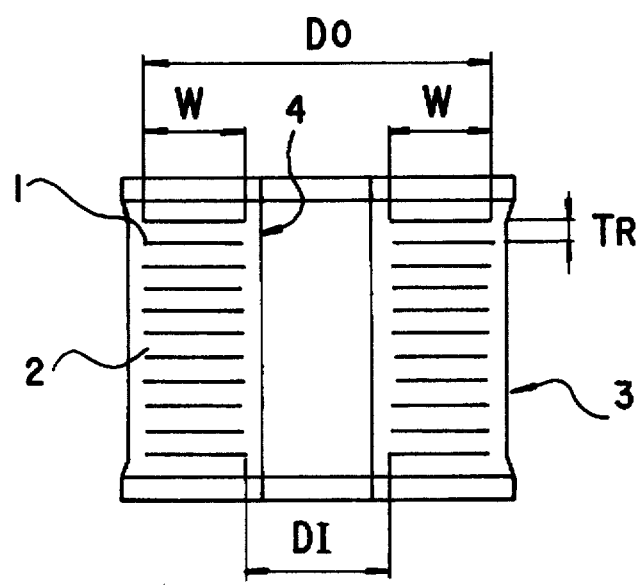

From the first through third comparative examples, it has been confirmed that the laminated rubber supports designed by the present inventive method each having a viscoelastic body or plastic body 5 fitted in the cylindrical hollow portion 4 as shown in FIG. 1(a) are stable with respect to variations in vertical load and have optimum equivalent attenuation constants.

Finally, as the fourth comparative example, present inventive articles designed by the present inventive method and comparative articles in the form of laminated rubber supports without a viscoelastic body or plastic body 5 fitted in the cylindrical hollow portion 4 were compared as to stability with respect to variations in vertical load. This fourth comparative example will now be described with reference to FIG. 13. The design conditions are as follows.

| Design displacement | $X_O = 150$ mm |
|---|---|
| Standard surface pressure | $\sigma_O = 50$ kgf/cm² |
| Outer diameter of rigid plates | $D_O = 600$ mm |
| Secondary shape coefficient | $S = 4.0$ |
| Safety factor | $a = 3$ |
| Design buckling surface pressure | $\sigma_s = a \cdot \sigma_O$ = 150 kgf/cm² |

Figure 13:
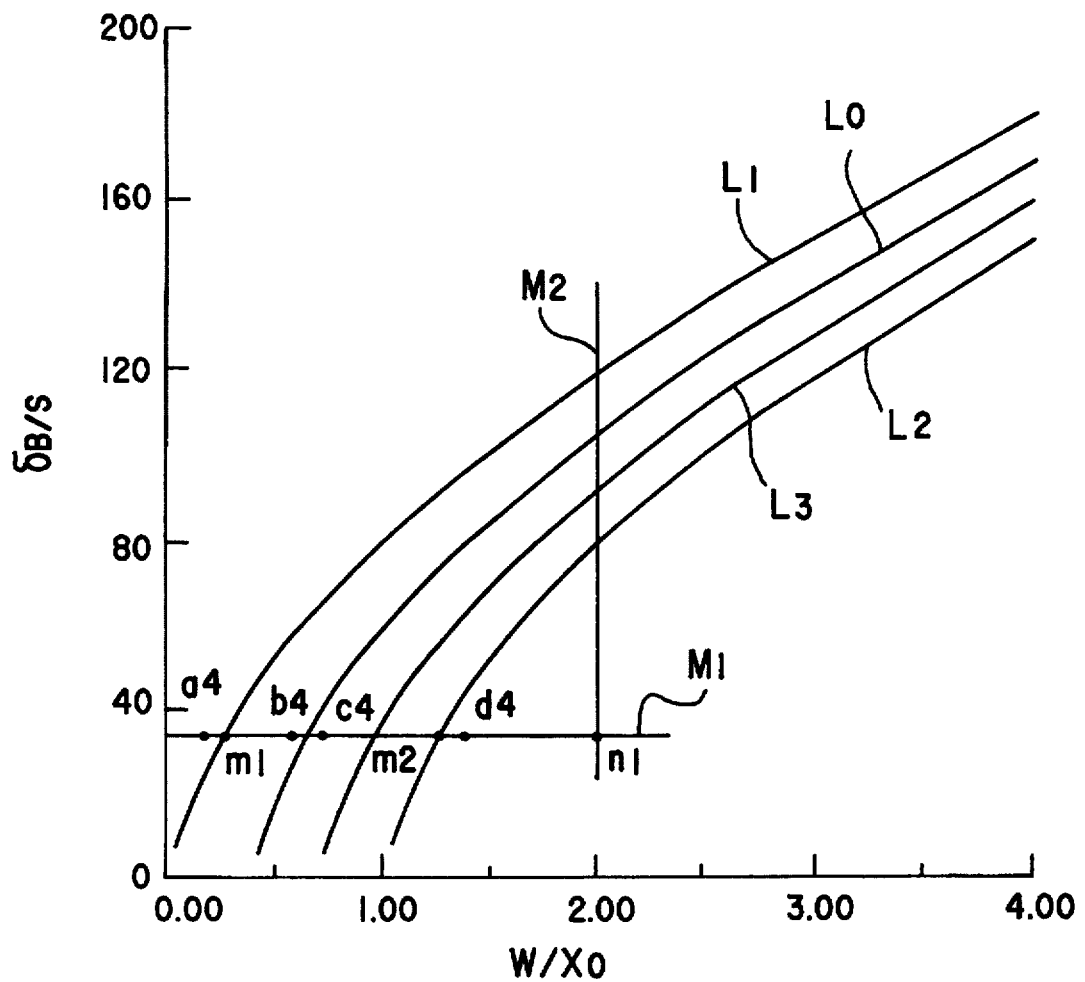
FIG. 13 is a characteristic graph showing the relation of [buckling surface pressure/secondary shape coefficient] to [rigid plate width/design displacement] in a fourth comparative example obtained by a critical load test we have conducted.
Figure 14:
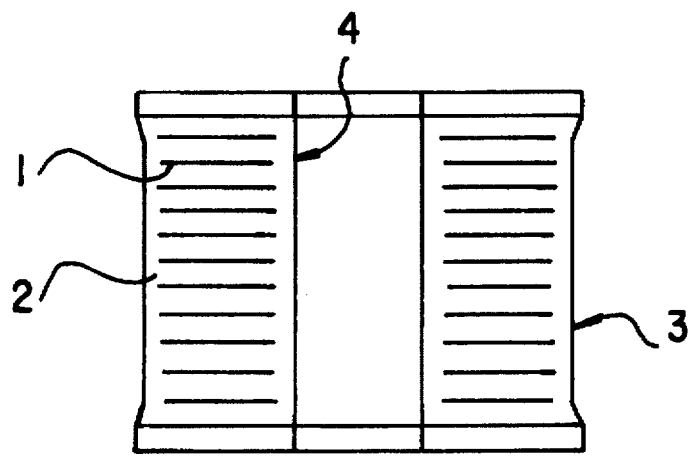
FIG. 14 is a sectional view showing an example of a laminated rubber support.
Figure 15:
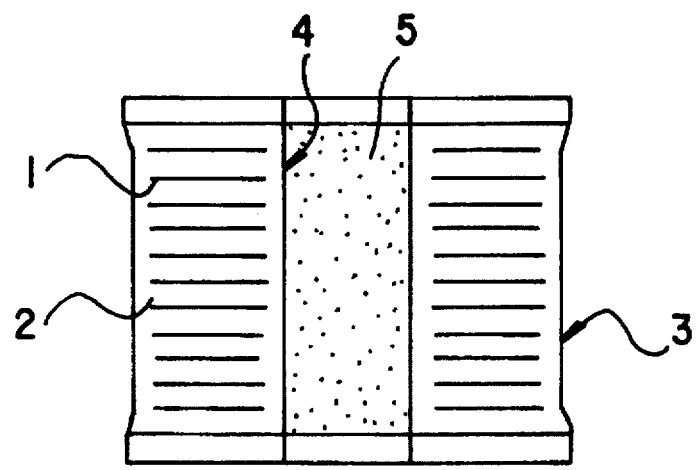
FIG. 15 is a sectional view showing another example of a laminated rubber support.

The straight line $M_1$ shown in FIG. 13 is obtained from said design buckling surface pressure $\sigma_S$ and secondary shape coefficient S. Further, since $0<W \leq D_O/2$, $0<W/X_O \leq 2.0$, which is the straight line $M_2$ shown in FIG. 13. Since the intersection $n_1$ between the straight lines $M_1$ and $M_2$ does not satisfy $$\sigma_B/S \geq A_5 + A_2[(W/X_0)+B_2]^{-0.5} + A_3(W/X_0),$$

the present inventive articles are designed in the region surrounded by the straight lines $M_1$, $M_2$ and the approximate curves $L_1$ and $L_3$, preferably by the values of $W/X_0$ on the line segment $m_1-m_3$ determined by the intersections $m_1$ and $m_3$ between the approximate curves $L_1$, $L_3$ and the straight line $M_1$.

Laminated rubber supports were manufactured by finding the width W of the rigid plates 1 at points $a_4$, $b_4$, $c_4$, and $d_4$ on the straight line $M_1$ shown in FIG. 13 and they were compared. The results of confirmation of the stabilities of the laminated rubber supports with respect to variations in vertical load are shown in Table 5.

TABLE 5

| | Inner dia. of rigid plate, mm | equivalent attenuation constant, % | Buckling surface pressure $\sigma_B$ kgf/cm² |
|---|---|---|---|
| Comparative article $a_4$ | 555 | 50 | 190 |
| Comparative article $d_4$ | 180 | 320 | 1100 |
| Inventive article $b_4$ | 420 | 160 | 600 |
| Inventive article $c_4$ | 390 | 250 | 700 |

As is clear from the results shown above, for the comparative article $a_4$, the buckling surface pressure found from a critical load test was 50 kgf/cm², which was less than the design buckling surface pressure (150 kgf/cm²). The laminated rubber support of this shape had poor stability with respect to variations in vertical load and could not be put to practical use. For the comparative article $d_4$, the buckling surface pressure found from a critical load test was 320 kgf/cm², which was greater than the design buckling surface pressure (150 kgf/cm²), but its vertical spring constant was greater than those of the inventive articles $b_4$ and $c_4$, being lower in vibration preventing performance than the inventive articles $b_4$ and $c_4$.

In contrast, the buckling surface pressure of the inventive articles $b_2$ and $c_2$ were greater than the design buckling surface pressure and their vertical spring constants were also high and so are their vibration preventing performances.

From the fourth comparative example, it has been confirmed that the laminated rubber supports designed by the present inventive method without a viscoelastic body or plastic body 5 fitted in the cylindrical hollow portion 4 as shown in FIG. 1(a) are stable with respect to variations in vertical load and high in vertical vibration preventing performance.

In addition, the definition of the width W of the rigid plate 1 in the case of FIG. 4(a) through 4(k) is given below.

(a) When the rigid plate is circular (solid), $W=D_O/2.$ (b) When the rigid plate is circular (hollow), $W=(D_0-D_1)/2.$ (c) When the rigid plate is square (solid), $W=a_0/2.$ (d) When the rigid plate is square (hollow), $W=(a_0-a_1)/2.$ (e) When the rigid plate is rectangular (solid), if the direction of deformation is one direction along a longer side as shown at (1), $W=b_0/2$ and if the direction of deformation is one direction along a shorter side as shown at (2) or any desired direction, $W=a_0/2.$ (f) When the rigid plate is rectangular (hollow), if the direction of deformation is one direction along a longer side as shown at (1), $W=(b_0-b_1)/2$ and if the direction of deformation is one direction along a shorter side as shown at (2) or any desired direction, $W=(a_0-a_1)/2$.

(g) When the rigid plate is regularly polygonal (2n+2 sided), n: natural number, W is determined by the straight line 1 connecting opposite sides as shown.

When solid, $W=a_0/2$.

When hollow, $W=(a_0-a_1)/2$.

(h) When the rigid plate is regularly polygonal (2n+1 sided), n: natural number, W is determined by the perpendicular 1 drawn from the opposite angle to the opposite side as shown.

When solid, $W=a_0/2$.

When hollow, $W=a_0-a_1=W'$.

(i) When the rigid plate is elliptic, if the direction of deformation is one direction along a longer side as shown at (1), when solid, $W=b_0/2$ and when hollow, $W=(b_0-b_1)/2$, and if the direction of deformation is one direction along a shorter side as shown at (2) or any desired direction, when solid, $W=a_0/2$ and when hollow, $W=(a_0-a_1)/2$.

(j) When there are a plurality of cylindrical hollow portions, the definition is given on the assumption that there is no cylindrical hollow portion. However, if a cylindrical hollow portion is located at the geometrical center, such cylindrical hollow portion alone is taken into account.

(k) When there is a hollow portion of any shape in any shape, the minimum value of W is defined as the width of the rigid plate, as shown.

INDUSTRIAL APPLICABILITY

The present invention makes it possible to design an optimum laminated rubber support of appropriate shape which, when interposed between a lower structure, such as a foundation or concrete slab and a super structure, such as a building or floor, is stable with respect to variations in vertical components of various vibration inputs, such as earthquakes, mechanical vibrations and traffic vibrations.

Therefore, laminated rubber supports obtained under the design conditions of the present invention have excellent performances including high attenuation and high buckling surface pressure and are suitable for earthquake proofing and vibration preventing measures in protecting buildings, apparatuses and artistic handicrafts.

What is claimed is:

1. A laminated rubber support wherein rigid plates and rubber-like elastic plates are alternately laminated to each other to form a laminate having a vertically extending hollow portion centrally formed therein, with a viscoelastic body or plastic body fitted in said hollow portion, said laminated rubber support comprising:

an internal size of the rigid plates is determined from an external size of the rigid plates based on a width of the rigid plates determined by $$\sigma_B/S \leq A_4+A_2[(W/X_0)+B_1]^{-0.5}+A_3(W/X_0)$$

$$\sigma_B/S \geq A_5+A_2[(S/X_0)+B_2]^{-0.5}+A_3(S/X_0)$$

(where $A_2$, $A_3$, $A_4$, $A_5$, $B_1$, $B_2$ are constants)

$$\sigma_B/S \geq \sigma_S/S$$

$$0<W \leq D_0/2$$

where W is the width of the rigid plates, S is a secondary shape coefficient, $\sigma_0$ is a standard surface pressure, $X_0$ is a design displacement, a is a safety factor, $\sigma_B$ is a buckling surface pressure, $\sigma_S$ is a design buckling surface pressure, and $D_0$ is the external size of the rigid plates.

2. A laminated rubber support wherein rigid plates and rubber-like elastic plates are alternately laminated to each other to form a laminate having a vertically extending hollow portion formed therein, said laminated rubber support comprising:

an internal size of the rigid plates is determining from an external size of the rigid plates based on a width of the rigid plates determined by $$\sigma_B/S \leq A_4+A_2[(W/X_0)+B_1]^{-0.5}+A_3(W/X_0)$$

$$\sigma_B/S \geq A_5+A_2[(S/X_0)+B_2]^{-0.5}+A_3(S/X_0)$$

(where $A_2$, $A_3$, $A_4$, $A_5$, $B_1$, $B_2$ are constants)

$$\sigma_B/S \geq \sigma_S/S$$

$$0<W \leq D_0/2$$

where W is the width of the rigid plates, S is a secondary shape coefficient, $\sigma_0$ is a standard surface pressure, $X_0$ is a design displacement, a is a safety factor, $\sigma_B$ is a buckling surface pressure, $\sigma_S$ is a design buckling surface pressure, and $D_0$ is the external size of the rigid plates.

* * * * *

UNITED STATES PATENT AND TRADEMARK OFFICE
CERTIFICATE OF CORRECTION

PATENT NO. : 5,465,945
DATED : November 14, 1995
INVENTOR(S) : Matsushita, et al Page 1 of 2

It is certified that error appears in the above-indentified patent and that said Letters Patent is hereby corrected as shown below:

Column 3, line 7, change "$\sigma_B/S \geq A_5 + A_2[(S/X_0)+B_2]^{-0.5}+A_3(S/X_0)$" to --$\sigma_B/S \geq A_5 + A_2[(W/X_0)+B_2]^{-0.5}+A_3(W/X_0)$--.

Column 5, line 48, change "5" to --4--.

Column 7, line 67 change "$\alpha_B/S = A_1 + A_2 \cdot (W/W_0)^{-0.5} + A_3 \cdot (W/X_0)$" to --$\alpha_B/S = A_1 + A_2 \cdot (W/X_0)^{-0.5} + A_3 \cdot (W/X_0)$--.

Column 9, line 38, change
"$\alpha_B/S = A_4 + A_2 \cdot [(W/W_0)+B]^{-0.5} + A_3 \cdot (W/X_0)$" to
--$\alpha_B/S = A_4 + A_2 \cdot [(W/X_0)+B_1]^{-0.5} + A_3 \cdot (W/X_0)$--.

Column 9, line 44, change "$\alpha_B/S = A_5 + A_2 \cdot [(W/W_0)+B_2]^{-0.5} + A_3 \cdot (W/X_0)$" to
--$\alpha_B/S = A_5 + A_2 \cdot [(W/X_0)+B_2]^{-0.5} + A_3 \cdot (W/X_0)$--.

Column 10, line 35, change "$0 < \leq D_0/2$" to --$0 < W \leq D_0/2$--.

Column 10, line 54, change "$\sigma_B/S \geq A_5 + A_2[(S/X_0)+B_2]^{-0.5}+A_3(W/X_0)$" to --$\sigma_B/S \geq A_5 + A_2[(W/X_0)+B_2]^{-0.5}+A_3(W/X_0)$--.

Column 11, line 6, change "$\sigma_B/S < A_5 + A_2[(S/X_0)+B_2]^{-0.5}+A_3(W/X_0)$" to --$\sigma_B/S < A_5 + A_2[(W/X_0)+B_2]^{-0.5}+A_3(W/X_0)$--.

Column 11, line 17, change "$X_0 > D_0/2_0 X_0$" to --$W/X_0 > D_0/2_0 X_0$--.

Column 11, line 33, change "$\sigma_B/S \geq A_5 + A_2[(S/X_0)+B_2]^{-0.5}+A_3(W/X_0)$" to --$\sigma_B/S \geq A_5 + A_2[(W/X_0)+B_2]^{-0.5}+A_3(W/X_0)$--.

UNITED STATES PATENT AND TRADEMARK OFFICE
CERTIFICATE OF CORRECTION

PATENT NO. : 5,465,945
DATED : November 14, 1995
INVENTOR(S) : Matsushita, et al It is certified that error appears in the above-indentified patent and that said Letters Patent is hereby corrected as shown below:

Column 12, line 3, change "$S/X_0 \leq 8$" to --$W/X_0 \leq 8$--; and
line 30, after "space" change "5" to --4--.

Column 18, line 11, change
"$\sigma_B/S \geq A_5 + A_2 \cdot [(S/X_0) + B_2]^{-0.5} + A_3 \cdot (S/X_0)$" to
--$\sigma_B/S \geq A_5 + A_2 \cdot [(W/X_0) + B_2]^{-0.5} + A_3 \cdot (W/X_0)$--; and
line 35, change
"$\sigma_B/S \geq A_5 + A_2 \cdot [(S/X_0) + B_2]^{-0.5} + A_3 \cdot (S/X_0)$" to
--$\sigma_B/S \geq A_5 + A_2 \cdot [(W/X_0) + B_2]^{-0.5} + A_3 \cdot (W/X_0)$--.

Signed and Sealed this

Tenth Day of December, 1996

Attest:

BRUCE LEHMAN

*Attesting Officer*

*Commissioner of Patents and Trademarks*